April 16, 1968  R. P. HAMLEN ET AL  3,378,408
ELECTROLYTIC CELL EMPLOYING ALUMINUM AS NEGATIVE
ELECTRODE AND AN ALKALINE ELECTROLYTE
CONTAINING HYPOCHLORITE ANIONS
Filed March 8, 1965  2 Sheets-Sheet 1
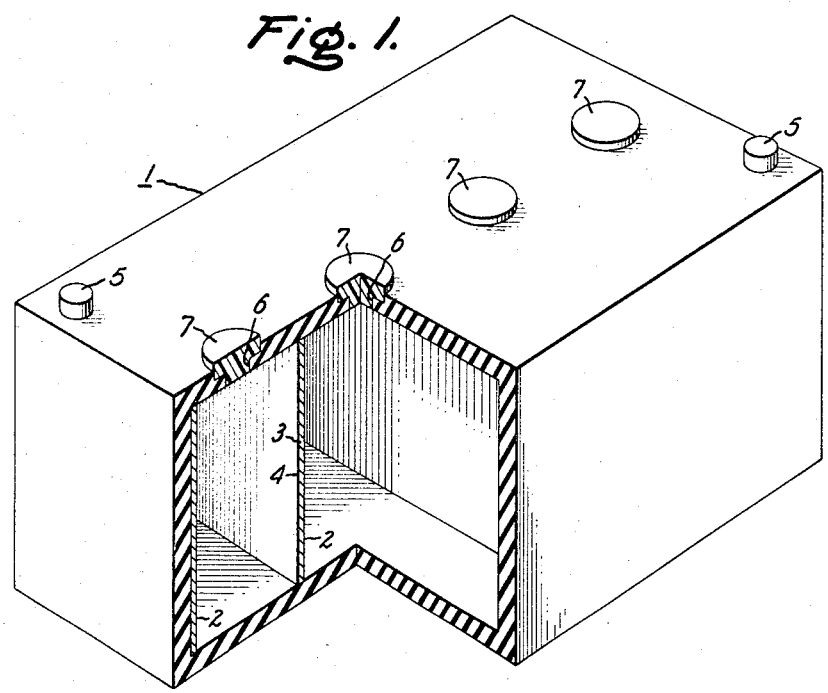
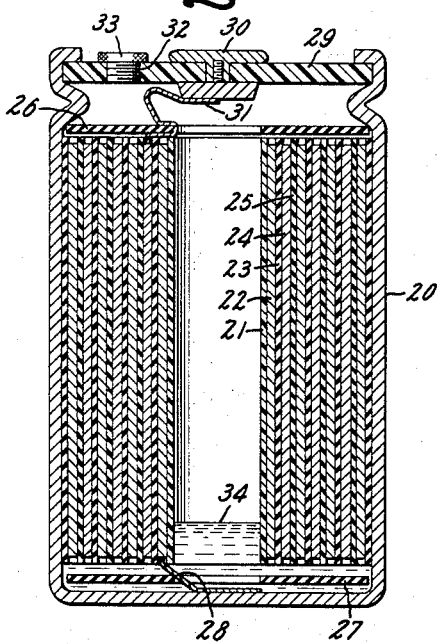
Inventors:
Robert P. Hamlen,
Randall N. King,
by Paul A. Frank
Their Attorney.

3,378,408
ELECTROLYTIC CELL EMPLOYING ALUMINUM AS NEGATIVE ELECTRODE AND AN ALKALINE ELECTROLYTE CONTAINING HYPOCHLORITE ANIONS
Robert P. Hamlen, Scotia, and Randall N. King, Johnstown, N.Y., assignors to General Electric Company, a corporation of New York
Filed Mar. 8, 1965, Ser. No. 437,724
7 Claims. (Cl. 136—100)

ABSTRACT OF THE DISCLOSURE

An electrolytic cell has a negative electrode of aluminum, a positive electrode of a metal lower in the electromotive series than aluminum, and an alkaline aqueous electrolyte containing hypochlorite anions. An electrolytic battery has a plurality of spaced plates containing both of the above electrode materials which are in contact with the electrolyte.

Our invention relates to a new electrolytic cell and battery employing aluminum as a negative electrode and an alkaline electrolyte containing hypochlorite anions.

There has long been a need for high output, inexpensive cells and batteries which can quickly and easily be placed in service after a long period of storage or disuse. One type of cell adapted to such use is comprised of silver chloride and magnesium plates which are activated for electrical use by the addition of water. While such type of cell or battery may be quickly placed in service, the silver and magnesium content reflects significantly in the unit cost. Further, prior to service, such cells or batteries must be stored under desiccated conditions in order to prevent magnesium destruction through corrosion.

It is an object of our invention to provide a high output inexpensive cell which can be quickly and easily placed in service after a long period of storage or disuse.

It is another object to provide a cell utilizing as a consumable electrode a low cost metal.

It is a further object to provide a cell utilizing an inexpensive, readily available electrolyte.

It is a still further object to provide a battery construction particularly suited to cells formed according to our invention.

These and other objects of our invention are accomplished by utilizing aluminum as a negative electrode and a noncorrosive metal lower in the electromotive series as a positive electrode together with an aqueous alkaline electrolyte containing hypochlorite anions.

Figure 3:
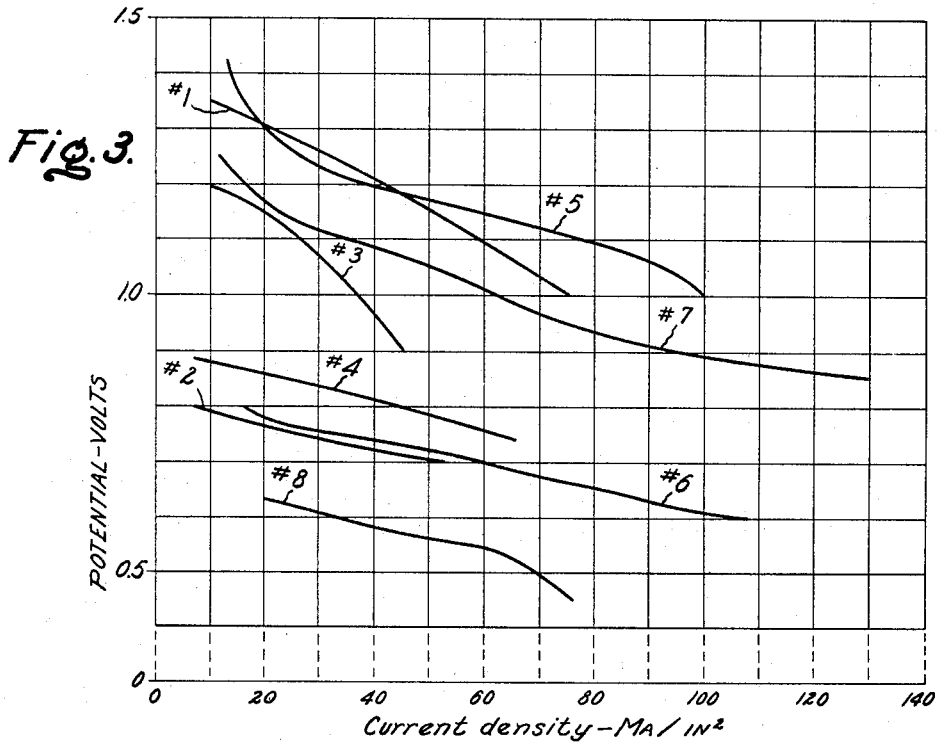
Figure 4:
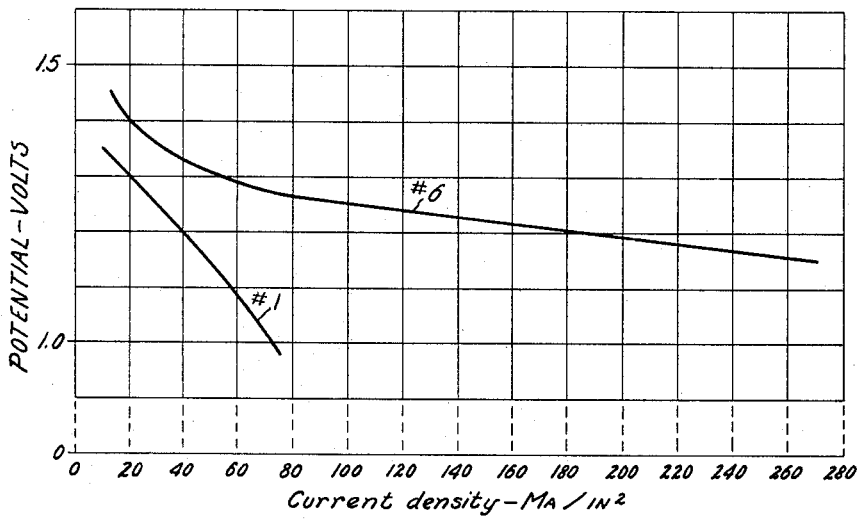

Our invention may be better understood by reference to the detailed description and the drawings, in which
  FIGURE 1 is a perspective view, partly in section, of a flat plate, back-to-back battery;
  FIGURE 2 is a vertical section of a spiral plate cell;
  FIGURE 3 is a plot of potential versus current density at various electrolyte values; and
  FIGURE 4 is a plot of potential versus current density at differing temperatures.

The negative plate or electrode of a cell formed according to our invention is formed of aluminum. Any aluminum of commercial purity may be employed. Additionally the plate may be formed of any aluminum alloy generally known in the art to be the functional equivalent of aluminum in electrolytic cell performance. Alloys of aluminum and mercury, aluminum and zinc, and aluminum and magnesium, for example, are so disclosed in "Use of Aluminum Anodes in Primary Batteries," S. Zaromb, Journal of the Electrochemical Society, vol. 109, No. 12. The metal may be employed in any convenient fabricating form, such as a screen, foil, plate, etc. Since the aluminum is consumed during operation of the cell, the quantity of the aluminum present in the plates may be matched to the intended use of the cell.

The positive plate or electrode of the cell may be formed of any material lying lower in the electromotive series than aluminum and which will not be corroded during cell use. Exemplary preferred materials include copper, stainless steel, carbon, nickel, oxide coated iron, etc. Since the positive plates are not consumed during cell operation, only minimal amounts of materials need be employed in cell fabrication. The materials may be employed as separate elements in the form of a screen, foil, thin plate, etc., as in the case of the aluminum negative plate. It is preferred that the positive plate take the form of a thin layer attached to one side of the aluminum plate so that a bare minimum amount of positive plate metal may be employed. Thin films of metal may be laid down by various well-known techniques, such as chemical deposition, electroplating, pressure laminating, etc.

An aqueous electrolyte is employed containing hypochlorite anions. Hypochlorite anions may be obtained by dissolving hypochlorous acid or any conveniently available salt thereof, such as laundry bleach (aqueous sodium hypochlorite commonly sold under the trademark "Chlorox"), bleaching powder or chlorinated lime (calcium chloride hypochlorite), etc. in water. It is preferred that the electrolyte be saturated with hypochlorite anions, although concentrations as low as 0.1 of saturation or lower may find utility.

In order to prevent the aluminum plates from becoming coated with aluminum oxide and effectively insulated from the electrolyte thereby reducing the output of the cell, it is necessary that the electrolyte be maintained alkaline. When hypochlorous acid or other acid or neutral source of hypochlorite anions is used, it is necessary that an alkalizing agent be also present in the electrolyte to maintain the solution alkaline, preferably with a pH above 10.5. Generally, preferred alkalizing agents include alkali metal bicarbonates, carbonates, and hydroxides. Of course, when the electrolyte is saturated with hypochlorite anions derived from alkali and alkaline earth hypochlorite salts or chlorinated lime, a pH in excess of 10.5 is imparted without resort to supplementary alkalizing agents. In certain instances, however, it may be desirable to employ a supplementary alkalizing agent in combination with an alkaline source of hypochlorite anions in order to increase the pH to an even higher alkaline value and to retain the pH after the hypochlorite concentration is reduced in use. While increase of the pH prevents aluminum oxide accumulation on the negative plates, at a higher pH the alkalizing agent may compete with the hypochlorite anion in attacking the aluminum. Accordingly, the choice of proper electrolyte pH will depend to some extent on whether maximum cell capacity for a short period or low cell capacity for an extended period is desired. For most purposes an initial electrolyte pH ranging from 10.5 to 14 is preferred.

The cell reactions contributing to the generation of electrical energy are believed to be as follows:

(1) 

(2) 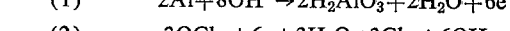

(3) 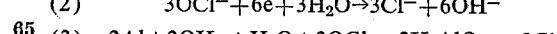

where (1) is the reaction occurring at the negative plate, (2) is the reaction occurring at the positive plate, and (3) is the over-all cell reaction. Electrons released at the negative plate by reaction (1) are of course transported to the positive plate for consumption in reaction (2) through an external electrical circuit.

In the application of the invention to specific cell or battery constructions, any number of well-known conventional configurations may be employed. As previously noted and as illustrated by reactions (1), (2), and (3), the positive electrode is not depleted during cell use. Accordingly, cells featuring back-to-back plate constructions in which the positive plate is only a thin film on the negative plate are generally prefered. Since extended shelf life is one of the salient features of our invention, it is generally preferred that any cell or battery construction include a port in the casing for adding electrolyte after cell assembly. Additionally, inasmuch as cells constructed according to our invention exhibit improved performance at elevated temperatures up to approximately 100° C., it may be desired to incorporate into the cell or battery some means for increasing the temperature of the electrolyte.

For purposes of illustration, an exemplary battery construction is depicted in FIGURE 1. The battery includes an insulating casing 1 housing a plurality of back-to-back plates 2. The plates are characterized as "back-to-back" since they are formed of an aluminum sheet 3 shown in cross section having adhered thereto a thin layer 4 of a noncorrosive metal having a lower position in the electromotive series than aluminum. Since the layers 4 are too thin to be shown in cross section, they are illustrated by heavy lines. The end-most plates are each connected to terminals 5 which serve as the positive and negative battery terminals. A port 6 is provided in the casing between each pair of plates. A closure or plug 7 is mounted within each port. As shown, the battery contains no electrolyte; however, electrolyte may be added through the ports when it is desired to place the battery in operation. It is appreciated that the closures or plugs will be loosely fitted or removed during cell portions so that any gaseous materials formed within the battery may be vented to the atmosphere.

A spiral plate cell construction is illustrated in FIGURE 2. The cell includes an electrically conductive casing 20 forming one terminal of the cell. Within the cell is mounted a winding spindle 21 formed of insulating material and having spirally wound thereon a four-layer assembly consisting of a first layer 22, which is an aluminum plate, a second layer 23 formed of a porous insulating spacer, a third layer 24 which is a plate formed of a metal occupying a lower position in the electromotive series than aluminum, and a fourth layer 25 which is a porous, insulating spacer. To prevent short-circuiting between the edges of the plates and the cell casing annular insulating disks 26 and 27 are provided. The aluminum plate is connected to the cell casing through lead 28. To provide a positive cell terminal an insulating element 29 is mounted in the upper end of the conductive casing by crimping. The element mounts a positive terminal 30 which is connected to the non-aluminum metal plate by lead 31. A port 32 is provided in the insulating element for the admission of electrolyte to the cell. As shown, the port is provided with a plug 33. The electrolyte is drawn between the plates by the capillary action of the porous, insulating spacers. Excess electrolyte fills the bottom of the casing and may extend upwardly into the winding spindle to a level 34 as illustrated.

The operation of the battery and cell illustrated in FIGURES 1 and 2, respectively, is essentially similar. The units are fully assembled except for the electrolyte and stored awaiting use. When the cell is required, it is placed into service by removal of the plug and the addition of electrolyte. The FIGURE 1 battery is capable of yielding high voltage and high current for a short period or a high voltage and low current for a relatively longer period. By contrast, the cell shown in FIGURE 2 is capable of yielding a low voltage and high current for a short period or a low voltage and low current for a relatively longer period. Batteries such as shown in FIGURE 1 may find utility as auxiliary car-starting batteries, for example, while cells of the FIGURE 2 type may be used to operate emergency lighting. A multiplicity of uses for cells and batteries constructed according to our invention will, of course, be apparent to one skilled in the art. Assuming that the aluminum plates are not depleted during any given use of a unit, the electrolyte may be removed and the unit again stored against future needs.

The following examples are illustrative of our invention rather than limiting:

Examples 1–5

For each of five tests, a cell was constructed having one aluminum plate and one copper plate spaced therefrom ⅛ inch. Each plate had a surface area of 1 in.² in contact with the electrolyte. Tests were run at 25° C. The composition of the electrolyte for each test was formed as indicated in Table I. Performance of each cell at a variety of current loads is indicated in FIGURE 3.

TABLE I

| Test No. | Electrolyte Components (g.) | | |
|---|---|---|---|
| | $Na_2CO_3$ | $CaCl(OCl)$ | $H_2O$ |
| 1 | 8 | 8 | 64 |
| 2 | 4 | 12 | 64 |
| 3 | 12 | 4 | 64 |
| 4 | 0 | 8 | 20 |
| 5 | 8 | 8 | 32 |

Example 6

A cell was constructed as described in Examples 1–5. An electrolyte was employed formed of 8 g. calcium chloride hypochlorite, 1 g. sodium hydroxide, and 32 g. water. The cell was operated at 25° C. The test results are plotted as Test No. 6 in FIGURE 3. The electrolyte pH was 12.0.

Example 7

A cell was constructed as described in Examples 1–5. An electrolyte was employed formed by mixing 1 g. of lye with 32 g. of an aqueous solution consisting essentially of water and 5.25 percent by weight of sodium hypochlorite, based on the weight of the aqueous solution. The cell was operated at 25° C. The test results are plotted as Test No. 7 in FIGURE 3. The electrolyte pH was 13.0.

Example 8

The procedure of Example 7 was repeated, except that the lye content of the electrolyte was omitted. The test results are plotted as Test No. 8 in FIGURE 3. The electrolyte pH was 11.2.

Example 9

A cell was constructed as described in Examples 2–6. An electrolyte was used corresponding to the electrolyte employed in Test No. 1. The cell was operated at 100° C. The test results are indicated as Test No. 6 in FIGURE 4. For purposes of comparison, Test No. 1 is also plotted in FIGURE 4.

Example 10

A strip of common aluminum window screen 1 and ¼ inch wide by 12 inches long was laid out. A plastic screen of like dimension was placed on top of the aluminum screen and a copper window screen of like dimension was superimposed on the plastic screen. A second plastic screen identical to the first was placed on the copper screen. Each screen had approximately 14 strands per linear inch. The four screens were rolled into a spiral and electrical leads were attached to the copper and aluminum screens. The spiral placed in a 150 ml. beaker and covered with an electrolyte formed of 8 g. of calcium chloride hypochlorite, 8 g. of sodium carbonate, and 64 g. of water. A current of 300 ma. was drawn from the cell at a potential of 1.2 volts for a period of one-half hour at 25° C. At the end of this period, the spiral was removed from the electrolyte and disassembled. The aluminum screen remained intact indicating a useful cell life well in excess of the test period.

What we claim as new and desire to secure by Letters Patent of the United States is:

1. An electrolytic cell comprising
   a casing,
   a negative electrode consisting essentially of aluminum,
   a positive electrode consisting essentially of a metal lower in the electromotive series than aluminum, and
   an alkaline aqueous electrolyte consisting essentially of water, a source of hypochlorite anions, and sufficient alkalizing agent to maintain a pH in excess of 10.5, said electrolyte being saturated with hypochlorite anions.

2. In an electrolytic cell according to claim 1, said positive electrode consisting of copper.

3. An electrolytic battery including
   a casing,
   a plurality of plates mounted in spaced relation within said casing, said plates consisting of a negative layer of aluminum contiguously related to a positive layer of metal lying lower in the electromotive series than aluminum, and
   an alkaline aqueous electrolyte consisting essentially of water, a source of hypochlorite anions, and sufficient alkalizing agent to maintain a pH in excess of 10.5, said electrolyte being saturated with hypochlorite anions, and said electrolyte lying between adjacent plates.

4. An electrolytic battery according to claim 3 in which one layer of each of said plates is copper.

5. An electrolytic battery according to claim 3 in which said aluminum layer forms the major portion of each of said plates.

6. An electrolytic cell including
   a casing,
   a negative plate consisting essentially of aluminum,
   a positive plate consisting essentially of a metal lying lower in the electromotive series than aluminum,
   said plates being spirally wound and mounted within said casing,
   porous means insulating said plates, and
   an alkaline, aqueous electrolyte permeating said porous insulating means consisting essentially of water, a source of hypochlorite anions, and sufficient alkalizing agent to maintain a pH in excess of 10.5, said electrolyte being saturated with hypochlorite anions.

7. An electrolytic cell according to claim 6 in which said positive plate consists of copper.

References Cited
UNITED STATES PATENTS

| Number | Date | Name | Class |
|---|---|---|---|
| 474,454 | 5/1892 | Lutcke | 136—155 |
| 1,332,483 | 3/1920 | Bridge | 136—83 |
| 1,412,513 | 4/1922 | Coulson | 252—62.2 |
| 1,864,652 | 6/1932 | Heise | 136—102 |
| 2,180,955 | 11/1939 | Heise et al. | 136—90 |
| 2,229,036 | 1/1941 | Bird et al. | 136—90 |
| 2,543,106 | 2/1951 | Harriss | 136—90 |
| 2,554,447 | 5/1951 | Sargent | 136—120 |
| 2,667,527 | 1/1954 | Pucher | 136—90 |
| 2,936,327 | 5/1960 | Schrodt et al. | 136—90 |

ALLEN B. CURTIS, *Primary Examiner.*

WINSTON A. DOUGLAS, *Examiner.*

A. SKAPARS, *Assistant Examiner.*